(12) United States Patent
Dangi et al.

(10) Patent No.: US 8,009,771 B2
(45) Date of Patent: Aug. 30, 2011

(54) INTERFERENCE REDUCTION IN A COMMUNICATION SIGNAL

(75) Inventors: Markus Dangi, Neu-Uim (DE);
Zhenning Shi, North Lyneham (AU);
Mark Reed, North Lyneham (AU)

(73) Assignee: National ICT Australia Limited,
Eveleigh, New South Wales (AU)

( * ) Notice: Subject to any disclaimer, the term of this patent is extended or adjusted under 35 U.S.C. 154(b) by 665 days.

(21) Appl. No.: 12/064,944

(22) PCT Filed: Aug. 30, 2006

(86) PCT No.: PCT/AU2006/001258
§ 371 (c)(1),
(2), (4) Date: Aug. 8, 2008

(87) PCT Pub. No.: WO2007/025335
PCT Pub. Date: Mar. 8, 2007

(65) Prior Publication Data
US 2009/0220016 A1 Sep. 3, 2009

(30) Foreign Application Priority Data

Aug. 31, 2005 (AU) .............................. 2005904763

(51) Int. Cl.
*H04L 27/06* (2006.01)
(52) U.S. Cl. ........ 375/340; 375/324; 375/346; 375/348; 375/349; 375/262; 375/325; 375/260
(58) Field of Classification Search .................. 375/340, 375/324, 346, 348, 349, 260, 262, 325
See application file for complete search history.

(56) References Cited

U.S. PATENT DOCUMENTS
2006/0023636 A1 2/2006 Farhang-Boroujeny et al.

FOREIGN PATENT DOCUMENTS
GB 2 398 979 9/2004

OTHER PUBLICATIONS

Wang et al. (Blind Turbo Equalization in Gaussian and Impulsive Noise, Jul. 2001, IEEE, vol. 50, pp. 1092-1105).*
Chen et al., "Convergence Analyses and Comparisons of Markov Chain Monte Carlo Algorithms in Digital Communications", IEEE Transactions on Signal Processing, vol. 50, No. 2, Feb. 2002, pp. 255-269.
Abed-Meraim et al., "Iterative Turbo Decoding Using Gibbs Sampling", Proc. $2^{nd}$ Int. Conf. on Information, Communications and Signal Processing, ICICS '99 Singapore, Dec. 7-10, 1999, 4 pages.

* cited by examiner

*Primary Examiner* — Kabir A Timory (57) ABSTRACT

The invention concerns the reduction of interference in a communication signal sent through a communication channel, where this interference is a performance limiting factor. The communication channel is any channel that can be described with memory elements. A Soft Input Soft Output receiver of a communication signal receives the communication signal and a priori information about the communication signal. Next creating candidate vectors having 1 to K samples by iteratively drawing samples using Gibbs sampling and using the a priori information. If a drawn kth sample of a candidate vector has not changed value for a predetermined number of created candidate vectors, then the value of the drawn kth sample is changed.

24 Claims, 5 Drawing Sheets

INTERFERENCE REDUCTION IN A COMMUNICATION SIGNAL

CROSS-REFERENCE TO RELATED APPLICATIONS

The present application claims priority from Australian Provisional Patent Application No 2005904763 filed on 31 Aug. 2005, the content of which is incorporated herein by reference.

TECHNICAL FIELD

The invention concerns the reduction of interference in a communication signal sent through a communication channel, where this interference is a performance limiting factor. Among other applications, the invention can be applied at a receiver for a communication system. Further, it can also be applied to a number of communication channels, such as Inter-symbol Interference (ISI), Multiple-Input Multiple-Output (MIMO), Code-Division Multiple-Access (CDMA), Antenna arrays, Space-Division Multiple-Access (SDMA), Continuous Phase Modulation (CPM), Interleave-Division Multiple-Access (IDMA) MIMO-Orthogonal Frequency Division Multiplex (MIMO-OFDM) and other channels where the channel can be described with memory elements. The invention can also be applied to a variety of high order modulation schemes such as Quadrature Amplitude Modulation (QAM). It can also apply to asynchronous systems or systems that contain multipath components. The invention also concerns a method for operating a receiver for a communications system, and software for operating a signal processor to perform the method; in each case invention may operate to reduce interference in a communication signal.

BACKGROUND OF THE INVENTION

Interference is the single biggest reason for performance degradation in a communication system. The interference can take many forms such as Intersymbol Interference (ISI), Multiple-Input Multiple-Output (MIMO), Code-Division Multiple-Access (CDMA), Antenna arrays, Space-Division Multiple-Access (SDMA), Interleave Division Multiple Access (IDMA), MIMO-Orthogonal Frequency Division Multiplex (MIMO-OFDM), Continuous Phase Modulation (CPM), Quaternary Amplitude Modulation (QAM), Multi-path, synchronous or asynchronous multi-user, and other channels where the channel can be described with memory elements. It also applies to asynchronous systems or systems that contain multi-path components.

Interference limits performance in most communication receivers. Interference also limits the capacity of communication systems, and therefore increases the cost of the overall communication system.

Due to the exponential computational complexity of the optimum detection, algorithms with largely reduced computational cost have gained attention. Detection schemes capable of processing soft-input information to deliver soft-outputs are of special interest as they represent an efficient means to reduce interference by using an iterative (turbo) loop, and allow an efficient means to reduce interference in an iterative fashion.

Other methods of performing interference reduction utilising linear methods based on the Minimum Mean Squared Error (MMSE) approach have high complexity of order $O(K^3)$ for one bit sample and K users, thus $O(K^2)$ per user and data symbol or equivalently $O(K^2)$ per received symbol for ISI channels with memory K.

Recently, Markov Chain Monte Carlo (MCMC) sampling methods have evolved as a solution to detection where interference is the main cause of performance degradation. Approaches based on Gibbs sampling as a special type of MCMC method are well suited due to their good trade off between performance and complexity. This Gibbs sampling method will now be explained further in reference to FIGS. 1 and 2.

Figure 1:
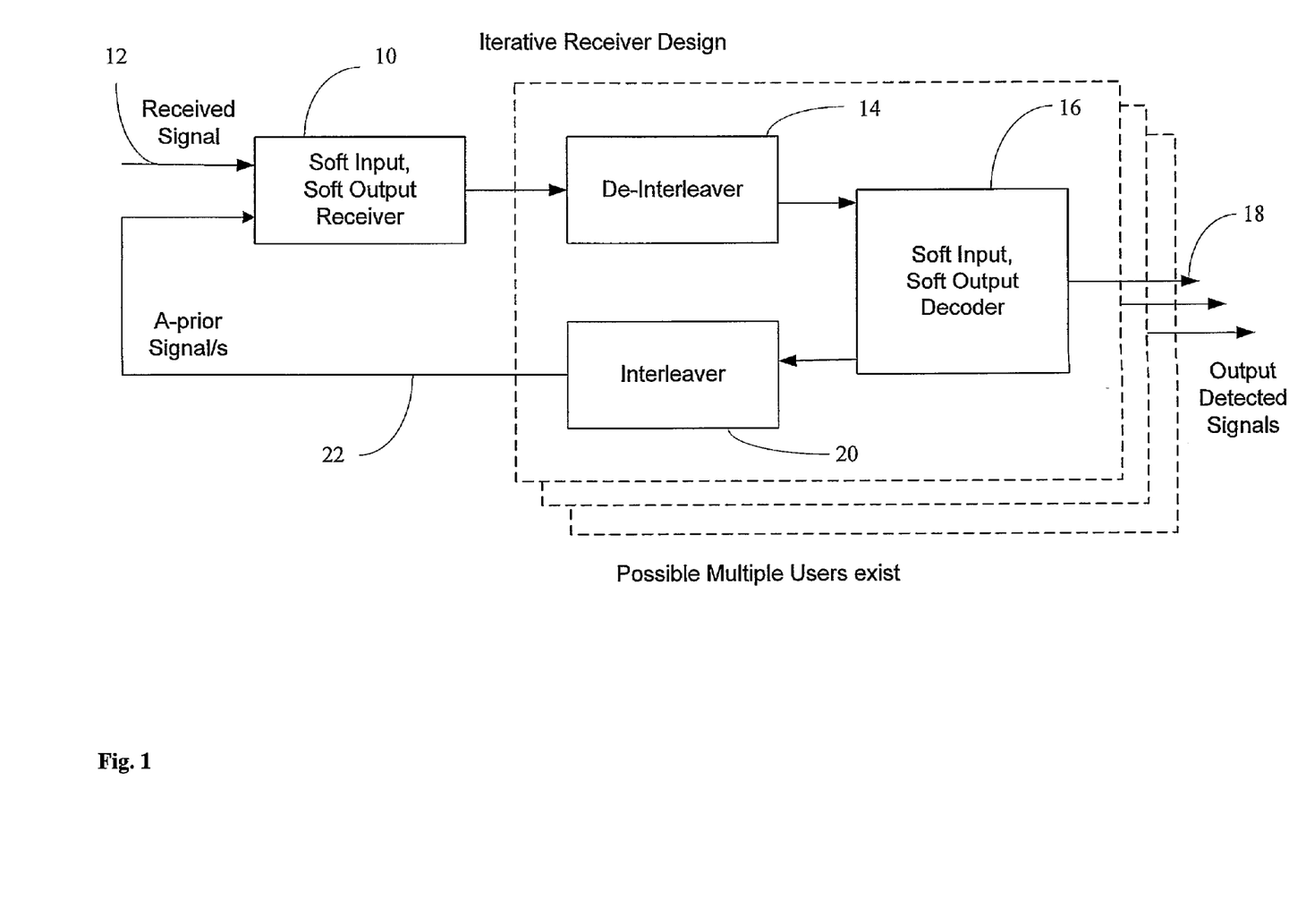
FIG. 1 shows schematically an overall iterative receiver design (Background Art)

FIG. 1 shows schematically an overall iterative receiver design. The Soft Input Soft Output (SISO) receiver 10 receives the incoming communication signal 12. The SISO 10 processes the received signal 12 and passes the processed signal to a de-interleaver 14. If the system is a multi-user system, then the processed signal is passed to multiple de-interleavers 14, one for each user. The de-interleaver 14 then passes the processed signal to the SISO decoder 16 which processes the signal to further determine the output signal 18 which is sent to a data sink. The SISO decoder 16 also passes the signal to the interleaver 20 that permutes bits 22 that are passed to the SISO receiver 10. The SISO receiver 10 uses the a priori signal 22 from the interleavers 20 to process the received signal 12. The a priori information is used in the log likelihood calculation.

Figure 2:
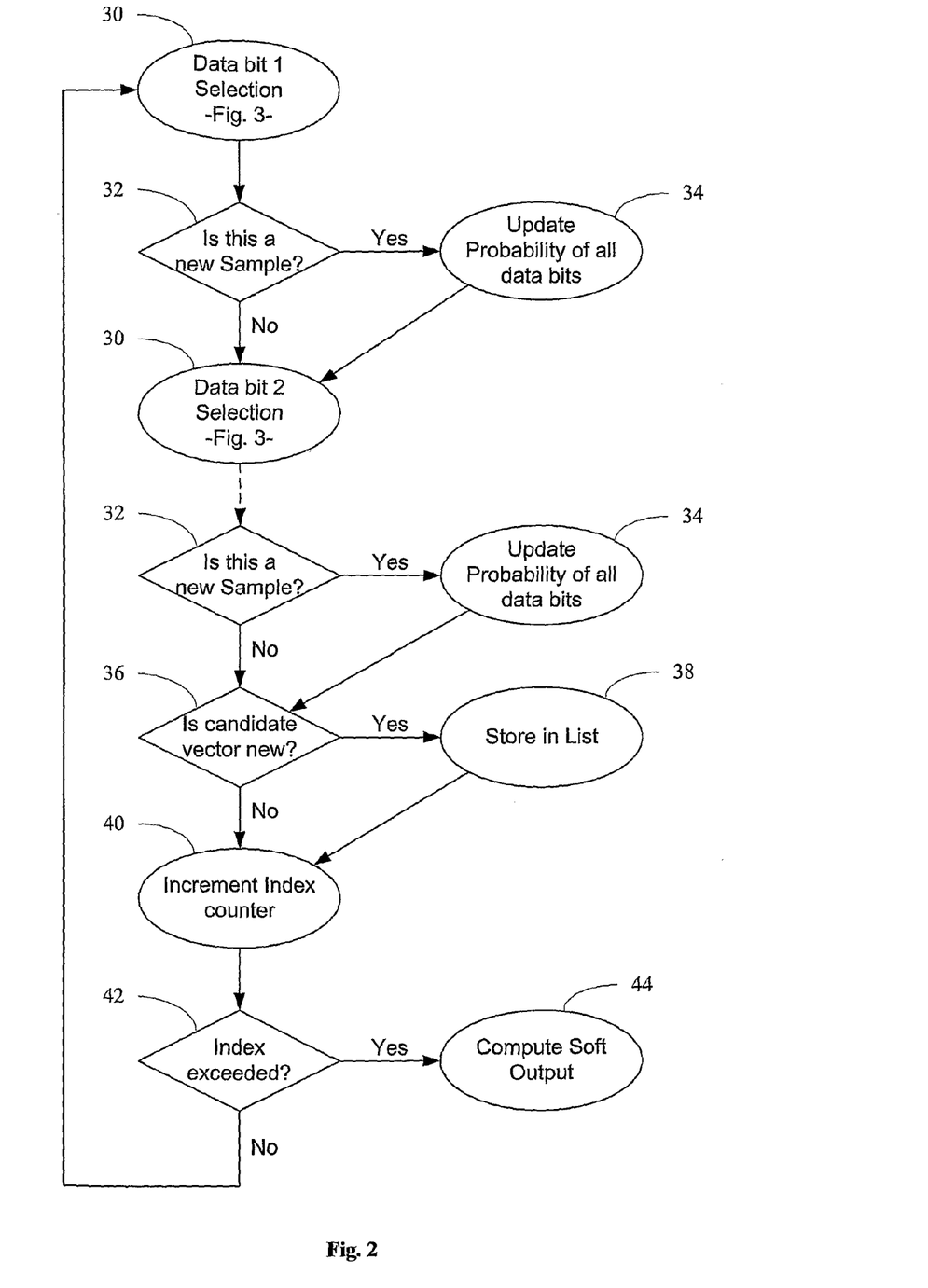
FIG. 2 shows the SISO receiver sample bit selection and update method of Gibbs sampling (Background Art); and, FIG. 3 shows the method performed by the SISO receiver to select a data bit (Background Art).
Figure 3:
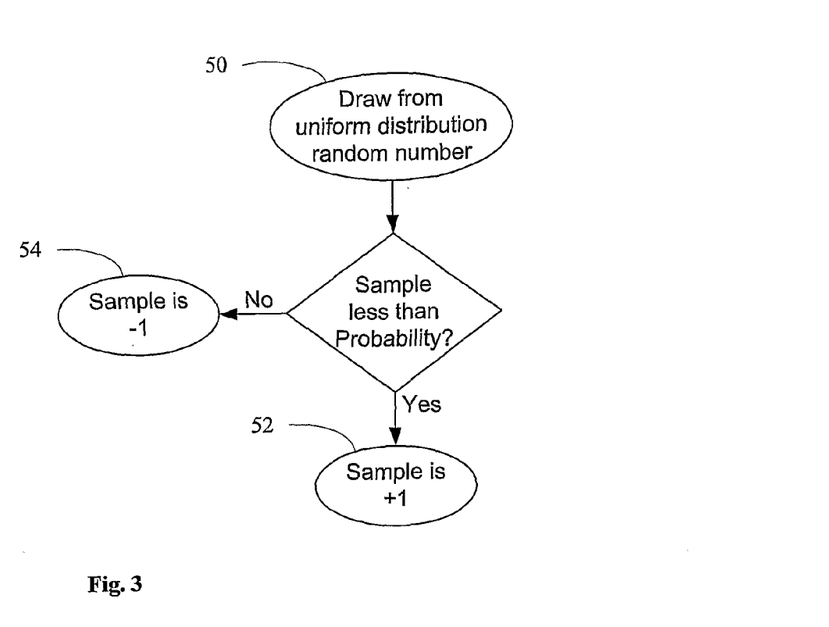

FIG. 2 shows the method performed by the SISO receiver 10 in processing the received signal 12 using sample bit selection and update processes. The first sample bit is drawn 30. This is shown in more detail in FIG. 3. The selection of a sample bit involves drawing from a uniform distribution a random number 50. If the random number is less (or alternatively more) than the predetermined probability, the sample bit is determined 52 to be +1. Otherwise, the sample is determined 54 to be −1.

A bit sample is selected 30 according to FIG. 2 multiple times (Ns) for each candidate vector. The number of bit samples K in a candidate vector depends upon the number of samples required to complete a candidate vector. The number of samples K is usually proportional to the number of user's in the system in a multi-user system, or the number of transmit antennas in MIMO. Each time a bit sample is selected 30, a determination is made 32 as to whether it is a new sample. That is, has the value of this kth sample of this jth candidate vector changed when compared to kth sample of the previously drawn iterations.

If the data sample is new then the probability of all sample bits is updated. Once all the sample bits that comprise a candidate vector are selected, it is determined whether 36 the candidate vector is a new vector. If it is, the new candidate vector is stored in a list 38.

The counter is then incremented 40 and the method is repeated until the counter equals the number of candidate vectors required 42 (J). Once J candidate vectors are generated the soft output is determined 44 and passed to each de-interleaver 14.

SUMMARY OF THE INVENTION

In a first aspect, the invention provides a receiver for a communication signal sent through a communication channel, the receiver comprising a Soft Input Soft Output receiver that, in use, is operable to receive the communication signal and a priori information about the communication signal and to use the a priori information to estimate the interference in the communication signal, the estimation being based on candidate vectors having K samples iteratively drawn using Gibbs sampling, wherein, if a drawn kth sample of a candidate vector has not changed value for a predetermined number of previously drawn candidate vectors, then the Soft Input Soft Output receiver operates to change the value of the drawn kth sample.

The performance of the invention at high and low signal to noise ratios is equivalent to that of the MMSE receiver without the high complexity of the MMSE technique.

Detection methods based on Gibbs sampling show a performance degradation where the Signal-to-Noise (SNR) is high. This invention considerably mitigates this problem and improves overall performance at all SNR levels by preventing the Gibbs sampling method from getting "stuck". This happens when the iterative sampling confirms that the probability that a particular bit sample has not had the chance to change value is high. This may cause the estimation of the bit samples and resulting candidate vectors (and therefore the estimation of the interference) to get "stuck" in that it will not assess other alternative bit sample values. By performing forced state transition on the value of a bit sample that has remained the same for multiple iterations, alternate candidate vectors will be visited that otherwise would not be visited by the method with reasonable complexity constraints. This produces a trade off between complexity and exploring alternative samples (but not all the samples), while improving overall performance.

As described above if the drawn kth sample has not changed value for a predetermined number of sequentially drawn candidate vectors, then the Soft Input Soft Output receiver operates to change the value of the drawn kth sample. The Soft Input Soft Output receiver may also operate to change the drawn sample if the sample has a low variance, that is, a low probability of changing value in further candidate vectors.

The variance of the kth sample may be based on kth samples of previously drawn candidate vectors. The variance of the kth sample may be predetermined from the sampling probability used when drawing kth samples for previously drawn candidate vectors according to the Gibbs sampling method.

The Soft Input Soft Output receiver may operate to change the value of the kth sample if the kth sample has a lower variance than all the other samples 1 ... (k−1) and (k+1) ... K. The variance of the other sample i may be based on sampling probability of ith samples.

The variance of the kth sample is estimated according to:

$$v_k = \Sigma_{d=\pm 1}(\mu_k - d)^2 P(d_k = d | d_{-k}) = 4\eta_k(1-\eta_k)$$

and where $\mu_k$ denotes the mean of the kth bit sample and $\eta_k$ is the sampling probability used by the Gibbs sampling method (soft estimate of the sample bit provided by the decoder). Therefore, for each sample 1 to K the variance is computed, if the kth sample has the lowest variance it is deemed to be "stuck", and the value of that sample is changed, such as flipped in binary modulated signal. This can also be applied to higher order modulation systems (QAM).

Alternatively or in addition, the Soft Input Soft Output receiver may operate to change the value of the drawn kth sample if it has a variance less than a predetermined value.

The receiver, in use, may be operable to the reduce the interference in the communication signal based on the estimation.

The kth drawn sample is bit sample having one of two values.

The communication system can be a CDMA/IDMA/ISI/CPM communication system, Multi-path, synchronous or asynchronous multi-user, or a system with an antenna array (SDMA/MIMO/MIMO-OFDM).

The receiver may further operate in use, to match filter the communication signal that has a reduced interference to recover the transmitted information.

The reduced interference communication signal may be used in an iterative channel estimation scheme, an iterative timing and frequency estimation scheme or used to detect new users or paths of users in a communication system.

The value of the bit sample for Binary Phase Shift Keying (BPSK) may be changed by changing the sign of the bit sample.

In calculating symbol probability and estimate transmit symbols, accurate channel state information (CSI) is essential. Use of the invention, for instance FST-MCMC improves the reliability of symbol estimates, which in turn results in better CSI estimates. Joint channel estimation and MCMC (the proposed method) can be used in a coherent receiver for MIMO-OFDM/OFDMA systems.

Interference cancellation can be incorporated, for instance to FST-MCMC, to further reduce the complexity. Partial interference may be estimated from the a priori information obtained by applying iterative detection and decoding (turbo loop) and subtracted to obtain a signal spanned over a smaller dimension and embedded with a higher noise level. MCMC techniques can then be applied to statistically improve the remaining data. The procedure is as follows:

1) Based on the symbol statistics from the channel decoding of the previous iteration, divide user/transmit antenna into two groups: those with high absolute-valued LLRs are arranged in an IC group (those with reliable feedback statistics, which could be represented by high absolute-valued LLRs or; the other forms, are arranged in an IC group); the others are put into a MCMC group.
2) Construct partial interference using the soft symbols from the IC group and subtract it from the received signals. Therefore, the so obtained signal spans over a subset of users, ie, only those in the MCMC group.
3) Operate FST-MCMC or MCMC on user/antenna data in MCMC group to better symbol statistics for channel decoding.

The prospective advantage is that the convergence speed is improved for FST-MCMC or MCMC since it is only applied to a subset of interested data. The underlying channel is less correlated hence the MCMC results might be more reliable. Statistics for users in IC group is used to construct partial interference for cancellation. This procedure may increase the noise level for the observed signal. However, since the statistics for IC group is quite reliable (from previous iterations), the increased noise due to the residual interference may not be severe. What is more, a reasonable noise level can help the MCMC chain to work robustly.

In a second aspect of the invention is a method for operating a Soft Input Soft Output receiver of a communication signal sent through a communication channel, the method comprising the steps of:
  receiving the communication signal and a priori information about the communication signal;
  creating candidate vectors having 1 to K samples by iteratively drawing samples using Gibbs sampling and using the a priori information, wherein, if a drawn kth sample of a candidate vector has not changed value for a predetermined number of created candidate vectors, then changing the value of the drawn kth sample; and
  providing an estimate of the interference in a communication signal based on the candidate vectors.

In a further aspect of the invention computer software stored on a machine-readable medium to perform the above method is provided. A machine-readable medium includes any mechanism that provides (i.e., stores and/or transmits) information in a form readable by a machine (e.g. a computer). For example, a machine readable medium includes read only memory (ROM), random access memory (RAM), magnetic disk storage media, optical storage media, flash memory devices, or electrical, optical, acoustical or other forms of propagated signals (e.g. carrier waves, infrared signals, digital signals).

BRIEF DESCRIPTION OF THE DRAWINGS

The background art has been described above with reference to the following drawings, in which.

An example of the invention will now be described in reference to the accompanying drawings in which.

BEST MODES OF THE INVENTION

This example describes an architecture for performing iterative data detection/decoding at a receiver of a communication system. The receiver applies to a large number of communication systems/channels and in this example is applied to a receiver of a Code Division Multiple Access (DS.CDMA) system. Here, the CDMA system is a communication system of a mobile telephone communication network having multiple user subscribers.

The system utilises an iterative receiver, including a Soft Input Soft Output (SISO) receiver 10 and multiple de-interleavers 14 as shown in FIG. 1. A SISO decoder 16 is also provided that passes the signal to the interleaver 20 which calculates the a priori signal 22 that is passed to the SISO receiver 10. The SISO receiver 10 uses the a priori signal 22 to process the received signal 12.

Figure 4:
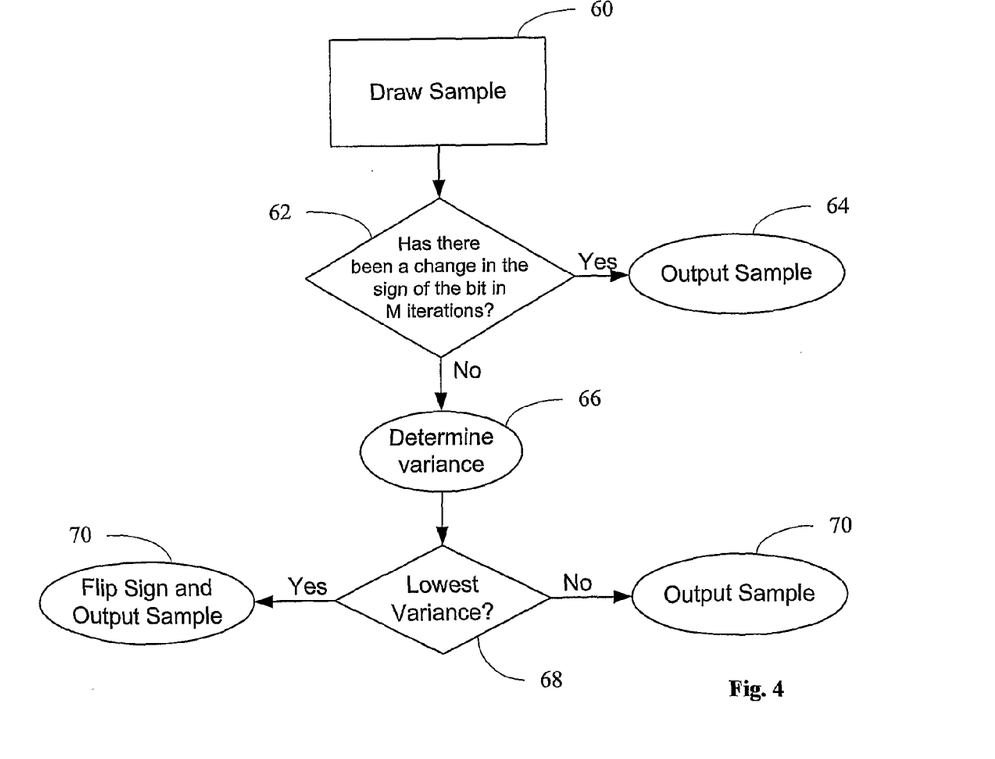
FIG. 4 shows the method of selecting a bit sample according to a best mode of the invention.

FIG. 4 shows the method of selecting a sample according to a best mode of the invention. This is performed in addition to the method shown FIG. 3 as discussed in relation to the background art.

Once a bit sample is determined to be either +1 or −1, an assessment is made as whether the value of bit samples for the user over a predetermined number of iterations m (according to FIGS. 2 and 3) has changed 62. If there has been a change in the bit samples of a user over the m iterations then the sample is left unchanged 64 and is used in accordance with the method shown in FIG. 2 to update the probability of all data bits.

If it is determined that there hasn't been a change in the user's bit samples over the m iterations then the variance of the user is determined 66, that is the likelihood that that future bit samples will change value given the past bit samples of all other users.

If the variance is high, this indicates that there is a high probability that the value of the user's bit samples will change in future iterations.

If the variance is low, this indicates that there is a low probability that the value of the user's samples will change in future iterations. At a low variance the Markov Chain is likely to get "stuck" by being trapped in a biased distribution.

To overcome this, if the variance for the user is determined to be low 68, that is the future value of the bit samples of the user have a low probability of changing, then the sign of the bit sample is changed 70 and the changed bit sample is used in accordance with the method of FIG. 2. The value of the bit sample can be changed if the variance of the user is less than the variance of the other users or the user's variance is lower than a predetermined threshold. It is found that by changing the bit sample with the lowest variance leads to significant enhanced performance. This reduces the correlation between drawn samples of one Markov chain with a simple implementation. Changing bit samples in MCMC can address overloaded systems and does not require complex Q-R decomposition in the front end.

If the variance was determined not to be the lowest variance and/or more than the determined threshold, then the sample is not changed and is used in accordance with the method of FIG. 2.

The following description provides an example of changing the value of a bit sample that has become "stuck". This example is based on a CDMA system, which for simplicity, has three users. Therefore in every iteration of sampling, three bit samples are selected, one for each user. In this system it has been predetermined that if a bit sample does not change value for four iterations (m=4) an analysis is made on whether the bit sample has become "stuck".

Say the first 3 iterations are drawn as follows:
−1 −1 +1 (1st candidate vector)
+1 −1 +1 (2nd candidate vector)
+1 −1 −1 (3rd candidate vector)

Here each row represents the bit samples for a user. So at this time the fourth iteration starts and for the first user the bit sample of value +1 is determined. So looking at the last four drawn bit samples for the first user (including the most recently drawn sample) is:
−1
+1
+1
+1

Since there has been a bit change in the last m=4 samples no change is made to the value of the most recently drawn bit sample.

Now a bit sample for the second user is drawn as part of the fourth iteration and has the value −1. So looking at the last four drawn bit samples for the second user (including the most recently drawn sample) is:
−1
−1
−1
−1

Since there has not been a change in the bit samples of the user for the last m=4 samples, the most recently drawn sample could be "stuck" and it will be analysed further. So, the variance of the second user is calculated according to the following equation:

$$v_k = 4\eta_k(1-\eta_k)$$

where k is the user index (in this case 1, 2 or 3) and $\eta_k$ is the corresponding sampling probability that is being used by the Gibbs sampling method when drawing samples for that user.

If the variance of the second user is less that a predetermined amount, then that bit sample is unlikely to change in the future and may be "stuck"—so we change the value of the most recently drawn bit sample in the 4th candidate vector to be +1.

Alternatively, to assess whether the most recently drawn bit sample for the second user is "stuck" we also calculate the variance of the first ($v_1$) and third ($v_3$) user. If the variance of the second user ($v_2$) is less than $v_1$ and $v_3$ then we change the value of the most recently drawn bit sample in the 4th candidate vector to be +1.

Having changed the value of this bit sample the candidate vectors would now be:

−1 −1 +1 (1st candidate vector)
+1 −1 +1 (2nd candidate vector)
+1 −1 −1 (3rd candidate vector)
+1 +1 (4th candidate vector so far)

Now a bit sample is drawn for the third user and it is determined whether the bit sample value for the third user has changed over 4 iterations. The variance is only calculated as described above if the third user's bit sample has not changed value over four iterations.

Alternatively, bit samples may be assessed for whether they have become "stuck" after each of the bit samples of a candidate vector are drawn.

Sampling continues until J candidate vectors have been created.

Figure 5:
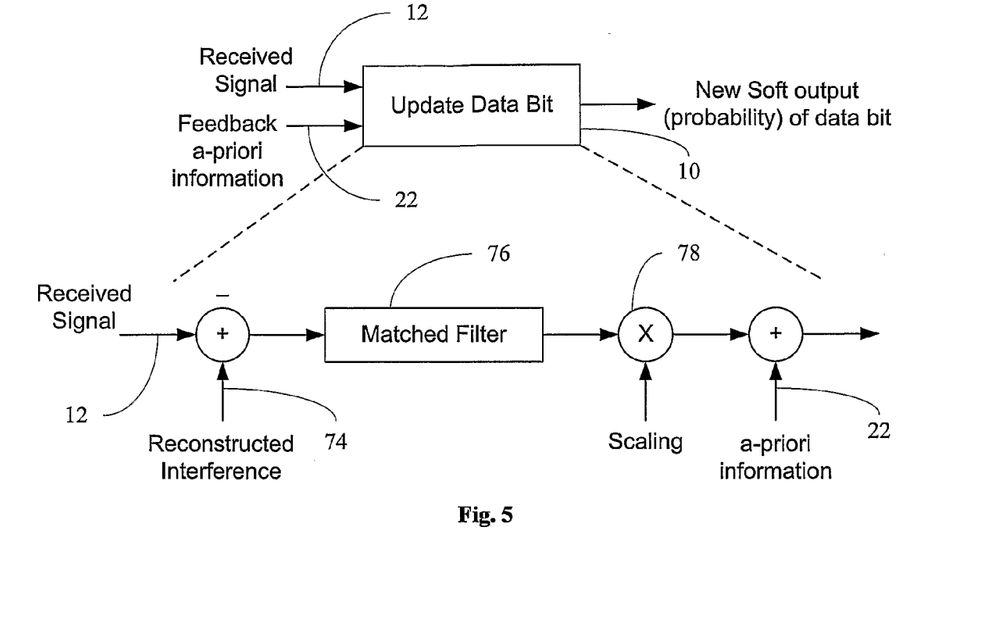
FIG. 5 shows the updating of probabilities for the bit samples by the SISO receiver.

FIG. 5 shows the updating of probabilities for the data bits by the SISO receiver 10. This updating uses the reconstructed interference 74 with the received signal 12. This is then passed through a matched filter 76 and scaled 78. A priori information 22 is added to produce a new soft output.

Finally, the data is combined to determine the final set of soft output values for the decoder. The multiple iterations are performed between the SISO receiver 10 and the SISO decoders 16, multiple variations of these steps are also possible.

The following description is an example of a multi-user Direct-Sequence Code-Division Multiple-Access (DS/CDMA) system model using the invention.

Figure 6:
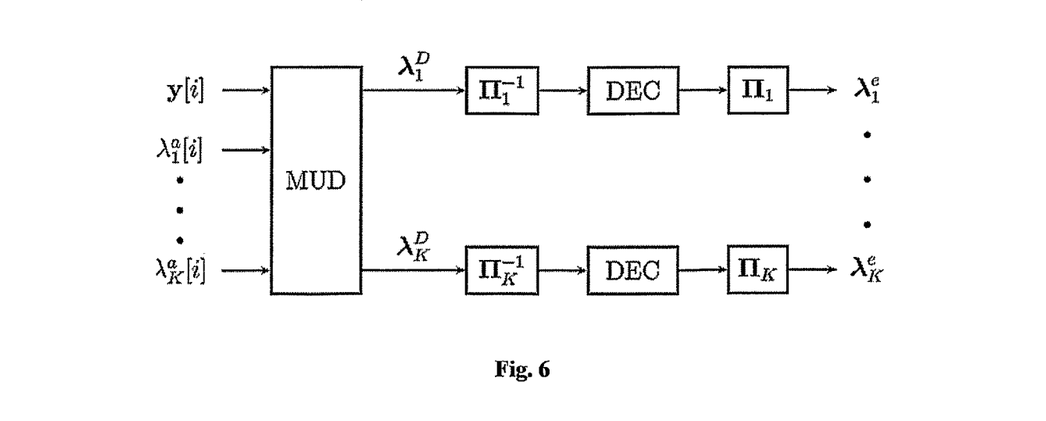
FIG. 6 shows the turbo receiver architecture.

A vector of equally probable source bits $q_k$, belonging to user k=1, ..., K, is protected by a convolutional code of rate $R_c$. The vector of encoded bits $c_k$ is fed into a random block permutor $\Pi_k$ to form the interleaved vector $v_k$. Each bit in $v_k$ corresponds to a specific discrete time index i and is mapped onto a BPSK symbol $d_k[i] \in \{-1;+1\}$. For conceptual ease, we consider a synchronous CDMA system over an AWGN channel. Thus, the received vector y[i], sampled at chip rate, is given by $$y[i] = S[i]d[i] + n[i] \quad (1)$$

where $d[i] = (d_1[i], d_2[i], \ldots, d_K[i])^T$ denotes the vector of transmit symbols at time slot i and S[i] is an N×K matrix, whose columns are the users' binary spreading sequences $s_k[i] \in \{-1/\sqrt{N}; +1/\sqrt{N}\}^N$. n[i] contains the samples of an AWGN process with spectral power density $\sigma_n^2 = N_0/2$. The users' spreading sequences are drawn randomly each time i the channel is used. At the receiver side turbo detection (iterative detection and decoding) is employed as illustrated in FIG. 6. The iterative detection algorithm expects besides the received vector y[i] a priori information of the code bits of all users in form of log-likelihood ratios (LLRs) $\lambda_k^a[i](k=1, \ldots, K)$. After processing all received vectors y[i] that correspond to a complete codeword, extrinsic output LLRs are generated for each user ($\lambda_1^D, \ldots, \lambda_K^D$). The LLRs $\lambda_k^D$ are fed into the corresponding decoder after de-interleaving to obtain interleaved, extrinsic LLRs $\lambda_K^e$ of the code bits that act as a priori information $\lambda_K^a[i]$ in a next iteration. In the last iteration, the decoders perform a hard decision on the information bits of the codewords. For the sake of clarity, we drop the time index i.

We consider Gibbs sampling combined with Monte Carlo integration. The purpose of the MUD algorithm is to provide estimates of the a-posteriori probability (APP) of all users, i.e., $P(d_k=+1|y, \lambda^a)$, $\lambda^a = (\lambda_1^a, \ldots, \lambda_K^a)^T$, k=1, ..., K. These probabilities were approximated by classical Monte Carlo integration yielding $$P(d_k = +1 \mid y, \lambda^a) \approx 1/N_s \sum_{n=1}^{N_s} P(d_k = +1 \mid y, d_{-k} = d_{-k}^{(n)}, \lambda^a), \quad (2)$$

where $d_{-k}^{(n)}$ denotes the symbols of all other users except for the kth user. The $N_s$ samples $d_{-k}^{(n)}$ in (2) are drawn from the distribution $P(d_k=+1|y,\lambda^a)$ that is efficiently modeled by a Markov chain (Gibbs sampling). We refer to this method as MCMC-I. The APPs are approximated $$P(d_k = +1 \mid y, \lambda^a) \approx \frac{P(d_{-k} = d_{-k}^{(n)}, d_k = +1 \mid \lambda^a) \sum_{n=1}^{L} f(y \mid d_{-k} = d_{-k}^{(n)} = +1)}{\sum_{n=1}^{L} \sum_{d=\pm 1} f(y \mid d_{-k} = d_{-k}^{(n)}, d_k = +1) P(d_{-k} = d_{-k}^{(n)}, d_k = d \mid \lambda^a)}, \quad (3)$$

where the samples $d_{-k}^{(n)}$ are obtained from Gibbs sampling according to MCMC-I, but only L distinct samples $d_{-k}^{(n)}$ are used for the evaluation of (3). The density $f(y|d_{-k}=d_{-k}^{(n)}, d_k=d)$ is multivariate Gaussian distributed with mean $S_{-k}d_{-k}^{(n)} + s_k d$ and covariance matrix $\sigma_n^2 I$. $S_{-k}$ is obtained from S by omitting the kth column. The probabilities $P(d_k=d_{-k}^{(n)}, d_k=d|\lambda^a)$ represent the a priori information that are easily evaluated as a K-fold product using the LLRs $\lambda^a$. This second method is referred to as MCMC-II. We remark that if the list in (3) was complete, i.e. $L=2^{K-1}$, (3) represented the optimal APP rule. Thus, MCMC-II might be interpreted as special type of a list detection algorithm. In contrast to MCMC-I no burn-in period (time until Markov chain converges to stationary distribution) is required.

In order to maintain a moderate computational complexity for both MCMC-I and MCMC-II one should use a small number of samples $N_s$. However, at high SNR the transition probabilities in the Markov chain approach extreme values, thus, not all "important" candidate samples $d_{-k}^{(n)}$ are likely to be drawn/found by Gibbs sampling.

In accordance with the invention, forced state transitions (FST) are introduced in the Markov chain. This offers the advantage of still running only one Markov chain. Thereby, we flip bits that do not change over the last m samples to force the Markov chain to cover more states and thus increase its efficiency in searching for candidate samples. As a criterion which bit or user should be flipped we observe the variance estimate $v_k = \sum_{d=\pm 1}(\mu_k - d)^2 P(d_k = d|d_{-k}) = 4 \eta_k(1-\eta_k)$ ($\mu_k$ denotes the mean of the kth symbol) for k=1, ..., K. Large values of $v_k$ indicate a large probability that the kth bit will change, small values that it is unlikely to change. At high SNR some of the bits appear to be very stable (small $v_k$), since the Markov chain is likely to be trapped in a biased distribution. However, this distribution can be quite different from the target distribution $P(d_{-k}|y,\lambda^a)$ we are interested in, since the number of samples might be not sufficiently large. Therefore, introducing forced state transitions, i.e., changing the sign of the bits that are stable and unlikely to be ever changed, increases the chance to overcome local maxima of the sampling distribution and visit states in the Markov chain that otherwise would require a huge number of samples to be drawn.

Changing the bit with smallest value of $v_k$ produces satisfactory results over a wide range of the parameter m.

Figure 7:
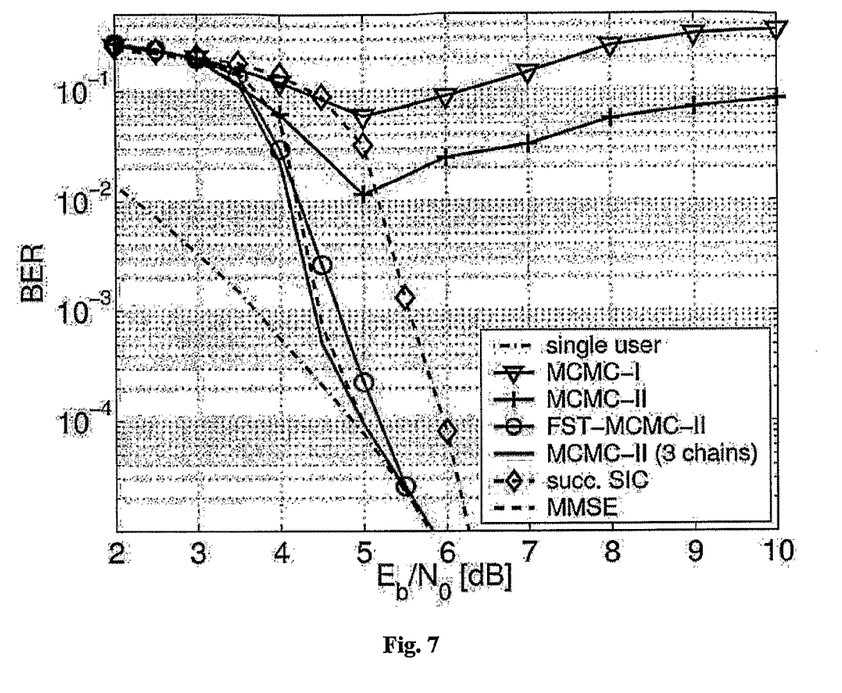
FIG. 7 is a graph showing a comparison of the invention to the standard turbo detection techniques.

FIG. 7 shows a comparison of the BER performance of the proposed MCMC methods and standard turbo multiuser detection techniques. The methods include using soft interference cancellation and MMSE filtering (MMSE), using successive soft interference cancellation (succ. SIC), using a-posteriori output of the decoders (which is better than using extrinsic only). The conventional Gibbs Sampling methods are MCMC-I (one Markov chain) and MCMC-II (two chains) where both these methods fail to converge to low BER at high SNR, instead, the BER starts to increase.

Figure 8:
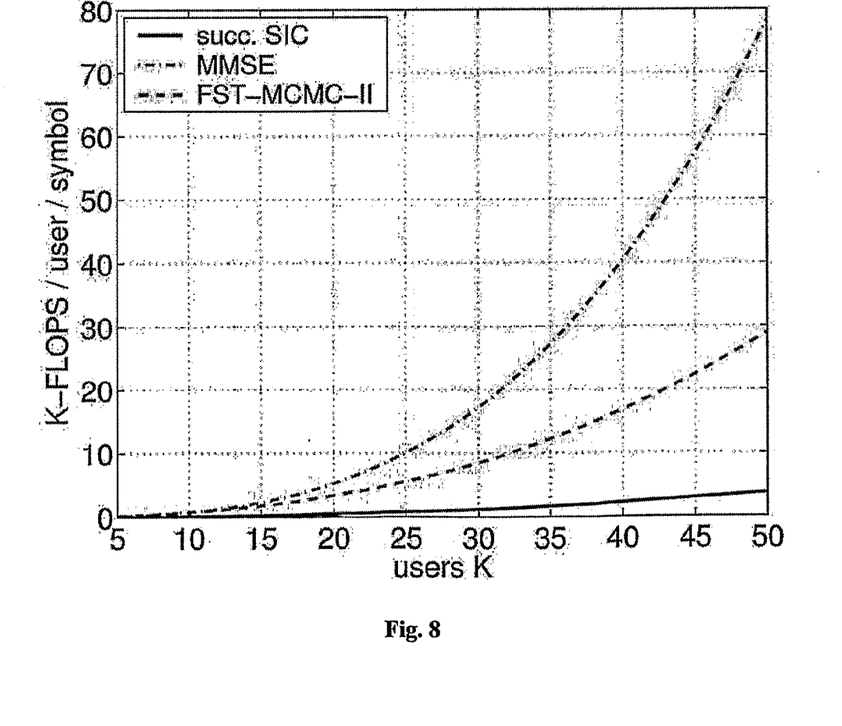
FIG. 8 is a graph showing the results of one embodiment of the invention based on 1000 Flops per user symbol.

The error in FIG. 7 for MCMC-I and MCMC-II is caused by a too small number of distinctive samples generated by finite $N_s$ draws in one Markov chain. However, the proposed modified scheme FST-MCMC-II shows a dramatic improvement and offers a similar performance as the MMSE approach while providing substantial savings in complexity as indicated by FIG. 8, as compared to the MMSE complexity and the succ. SIC complexity.

The method of the invention can be applied at the receiver of a communication system. It applies to a number of communication channels, where a subset includes Intersymbol Interference (ISI), Multiple-Input Multiple-Output (MIMO), Code-Division Multiple Access (CDMA), Space Division Multiple Access (SDMA), MIMO-Orthogonal Frequency Division Multiplex (MIMO-OFDM), Continuous Phase Modulation (CPM), Antenna arrays, Interleave Division Multiple Access (IDMA), Space-Division Multiple-Access (SDMA), Continuous Phase Modulation (CPM), and other channels where the channel can be described with memory elements. It also applies to asynchronous systems or systems that contain multiple path components.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A receiver to receive a communication signal sent through a communication channel, the receiver comprising:
a Soft Input Soft Output receiver that, in use, is operable to receive the communication signal and a priori information for the communication signal and to use the a priori information to estimate an interference in the communication signal, the estimation based on candidate vectors having K samples iteratively drawn using Gibbs sampling,
wherein the Soft Input Soft Output receiver is configured to change the value of the drawn kth, sample, if a drawn kth sample of a candidate vector has not changed value for a predetermined number of candidate vectors, if a drawn kth sample has a low variance, if a kth sample has a lower variance than all the other samples 1 ... (k−1) and (k+1) ... K.

2. The receiver according to claim 1 wherein the variance of the kth sample is based on kth samples of previously drawn candidate vectors.

3. The receiver according to claim 2, wherein the variance of the kth sample is determined from the sampling probability used when drawing kth samples for previously drawn candidate vectors according to the Gibbs sampling method.

4. The receiver according to claim 1, wherein the variance of the other sample i is based on ith samples of previously drawn candidate vectors.

5. The receiver according to claim 1 wherein the variance of the kth sample is estimated according to:

$$v_k = \Sigma_{d=\pm 1}(\mu_k - d)^2 P(d_k = d | d_{-k}) = 4\eta_k(1-\eta_k)$$

and where $\mu_k$ denotes the mean of the kth bit sample and $\eta_k$ is the sampling probability used by the Gibbs sampling method.

6. The receiver according to claim 1, wherein the receiver, in use, is operable to reduce the interference in the communication signal based on the estimation.

7. The receiver according to claim 1, wherein the kth drawn sample is bit sample having one of two values.

8. The receiver according to claim 1, wherein the communication channel is of a communication system that is involves one or more of SDMA, CDMA, IDMA, ISI, CPM, QAM, MIMO, OFDM, Multi-path, synchronous or asynchronous multi-user, communication system, and other channels where the channel can be described with memory elements.

9. The receiver according to claim 1, wherein the receiver further comprises means for interference cancellation.

10. The receiver according to claim 9, wherein the receiver combines means for both interference cancellation and Markov Chain Monte Carlo (MCMC) techniques.

11. The receiver according to claim 10, wherein the receiver estimates partial interference from the a priori information obtained by applying iterative detection and decoding, and this is subtracted to obtain a signal spanned over a smaller dimension and embedded with a higher noise level; MCMC techniques are then applied to statistically improve the remaining data.

12. A method for operating a Soft Input Soft Output receiver of a communication signal sent through a communication channel, the method comprising the steps of:
the Soft Input Soft Output receiver, receiving the communication signal and a priori information for the communication signal;
creating candidate vectors having 1 to K samples by iteratively drawing samples using Gibbs sampling and the a priori information;
changing the value of the drawn kth sample if a drawn kth sample of a candidate vector has not changed value for a predetermined number of created candidate vectors, if a drawn kth sample has a low variance, if a kth sample has a lower variance than all the other samples 1 ... (k−1) and (k+1) ... K; and
providing an estimate of an interference in a communication signal based on the candidate vectors.

13. The method according to claim 12, wherein the variance of the kth sample is based on kth samples of previously drawn candidate vectors.

14. The method according to claim 13, wherein the method further comprises determining the variance of the kth sample from the sampling probability used when drawing kth samples for previously created candidate vectors according to the Gibbs sampling method.

15. The method according to claim 12, wherein the variance of the other sample i is based on ith samples of previously drawn candidate vectors.

16. The method according to claim 12, wherein the method further comprises changing the value of the drawn kth sample if it has a variance less than a predetermined value.

17. The method according to claim 12, wherein the variance of the kth sample is estimated according to:

$$v_k = \Sigma_{d=\pm 1}(\mu_k-d)^2 P(d_k=d)|d_{-k}) = 4\eta_k(1-\eta_k)$$

and where $\mu_k$ denotes the mean of the kth bit sample and $\eta_k$ is the sampling probability used by the Gibbs sampling method.

18. The method according to claim 12, wherein the method further comprises the step of reducing the interference in the communication signal based on the estimation.

19. The method according to claim 12, wherein the kth drawn sample is a bit sample having one of two values.

20. The method according to claim 12, wherein the communication channel either one or multiple of a SDMA, CDMA, IDMA, ISI, CPM, QAM, MIMO, OFDM, Multipath, synchronous or asynchronous multi-user, communication system, and other channels where the channel can be described with memory elements.

21. The method according to claim 12, wherein the method further comprises the step of interference cancellation.

22. The method according to claim 21, wherein the method combines both interference cancellation and Markov Chain Monte Carlo (MCMC) techniques.

23. The method according to claim 22, wherein the method estimates partial interference from the a priori information obtained by applying iterative detection and decoding, and then subtracts this partial interference to obtain a signal spanned over a smaller dimension and embedded with a higher noise level; the method then applies MCMC techniques to statistically improve the remaining data.

24. A non-transitory machine readable medium having stored thereon instructions, that when executed by a computer system, cause a Soft Input soft Output receiver to:
 receive a communication signal and a priori information for the communication signal;
 create candidate vectors having 1 to K samples by iteratively drawing samples using Gibbs sampling on the a priori information;
 change a value of the drawn kth sample if a drawn kth sample of a candidate vector has not changed value for a predetermined number of created candidate vectors, if a kth sample has a low variance, if a kth sample has a lower variance than all the other samples 1 ... (k−1) and (k+1) ...K; and
 provide an estimate of an interference in a communication signal based on the candidate vectors.

* * * * *